C. R. KADDELAND.
MECHANICAL MOVEMENT.
APPLICATION FILED JAN. 17, 1916.

1,198,727.

Patented Sept. 19, 1916.
5 SHEETS—SHEET 1.

C. R. KADDELAND.
MECHANICAL MOVEMENT.
APPLICATION FILED JAN. 17, 1916.
1,198,727.
Patented Sept. 19, 1916.
5 SHEETS—SHEET 2.
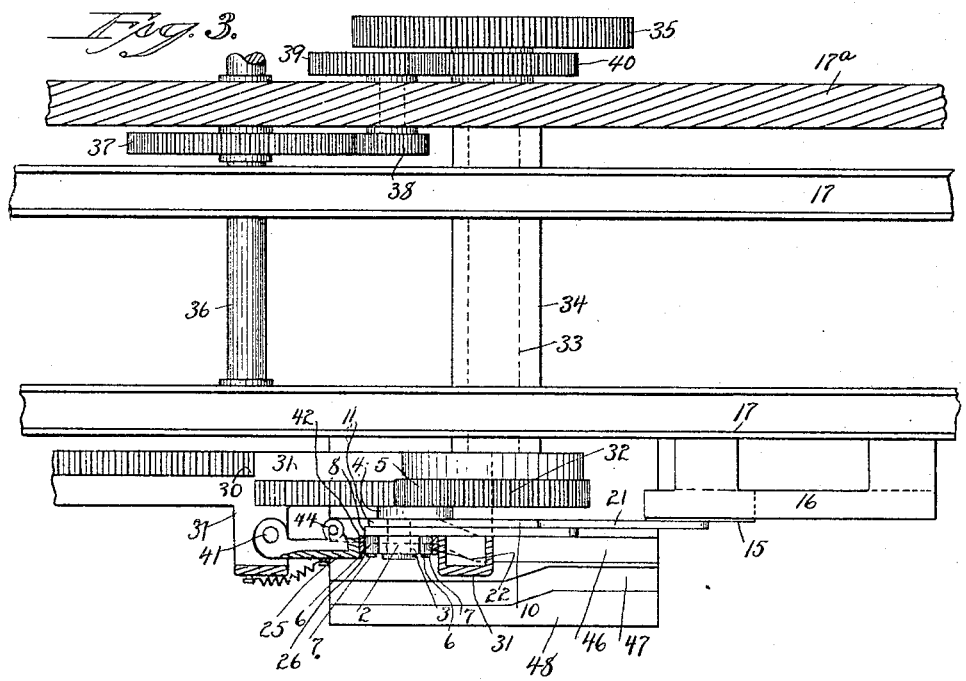
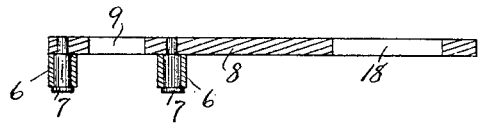
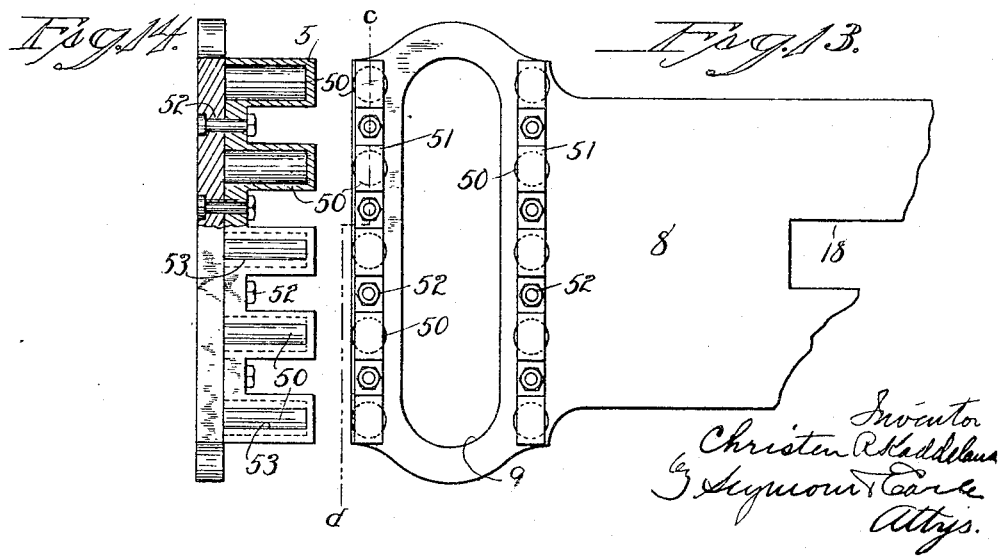

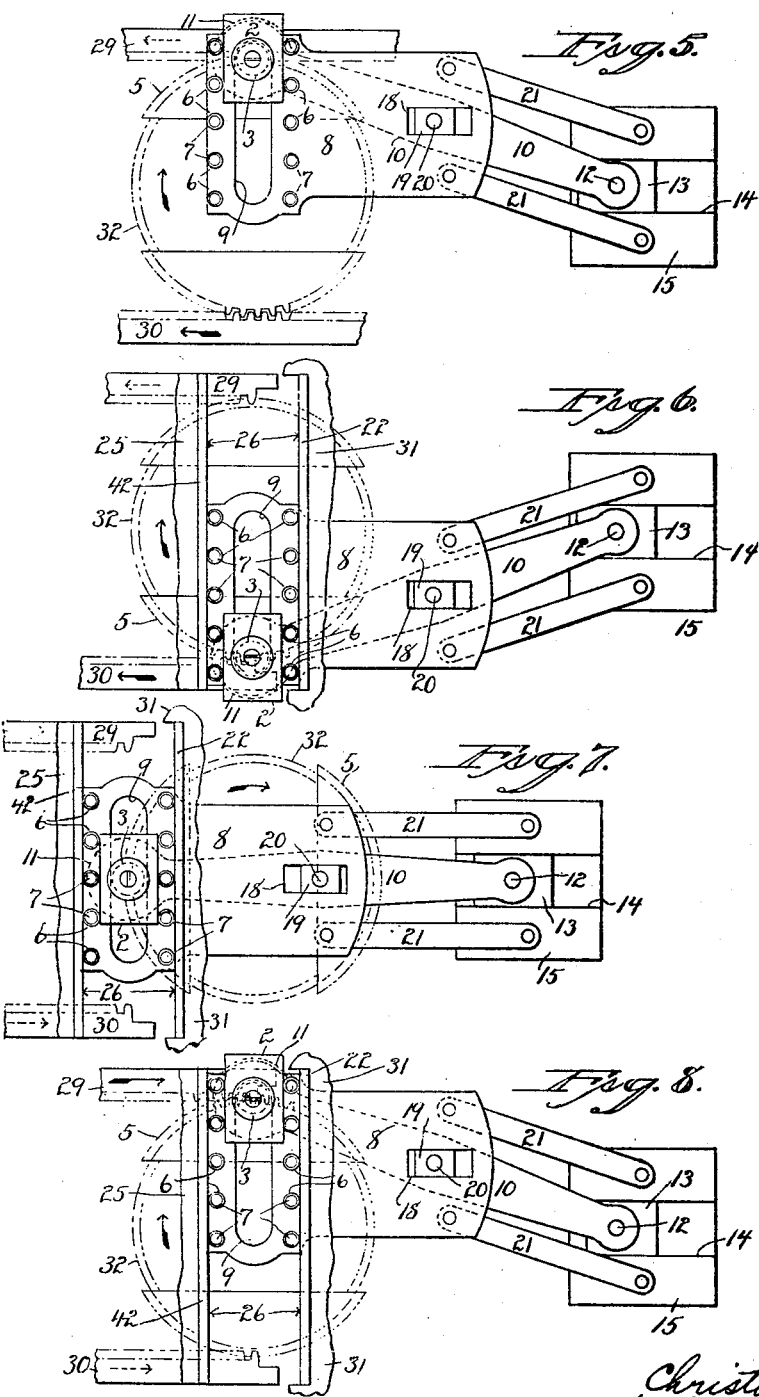

C. R. KADDELAND.
MECHANICAL MOVEMENT.
APPLICATION FILED JAN. 17, 1916.
1,198,727.
Patented Sept. 19, 1916.
5 SHEETS—SHEET 4.
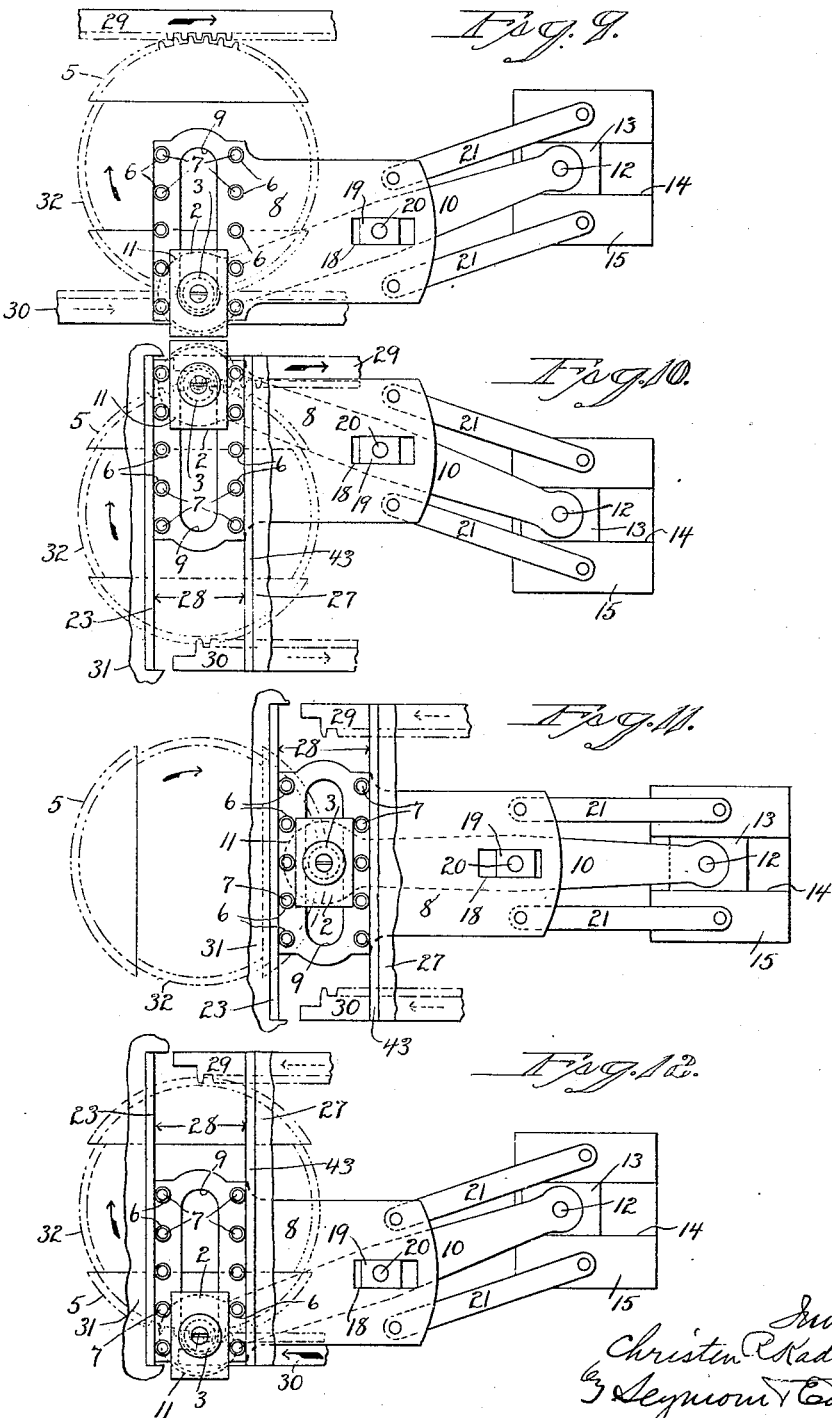

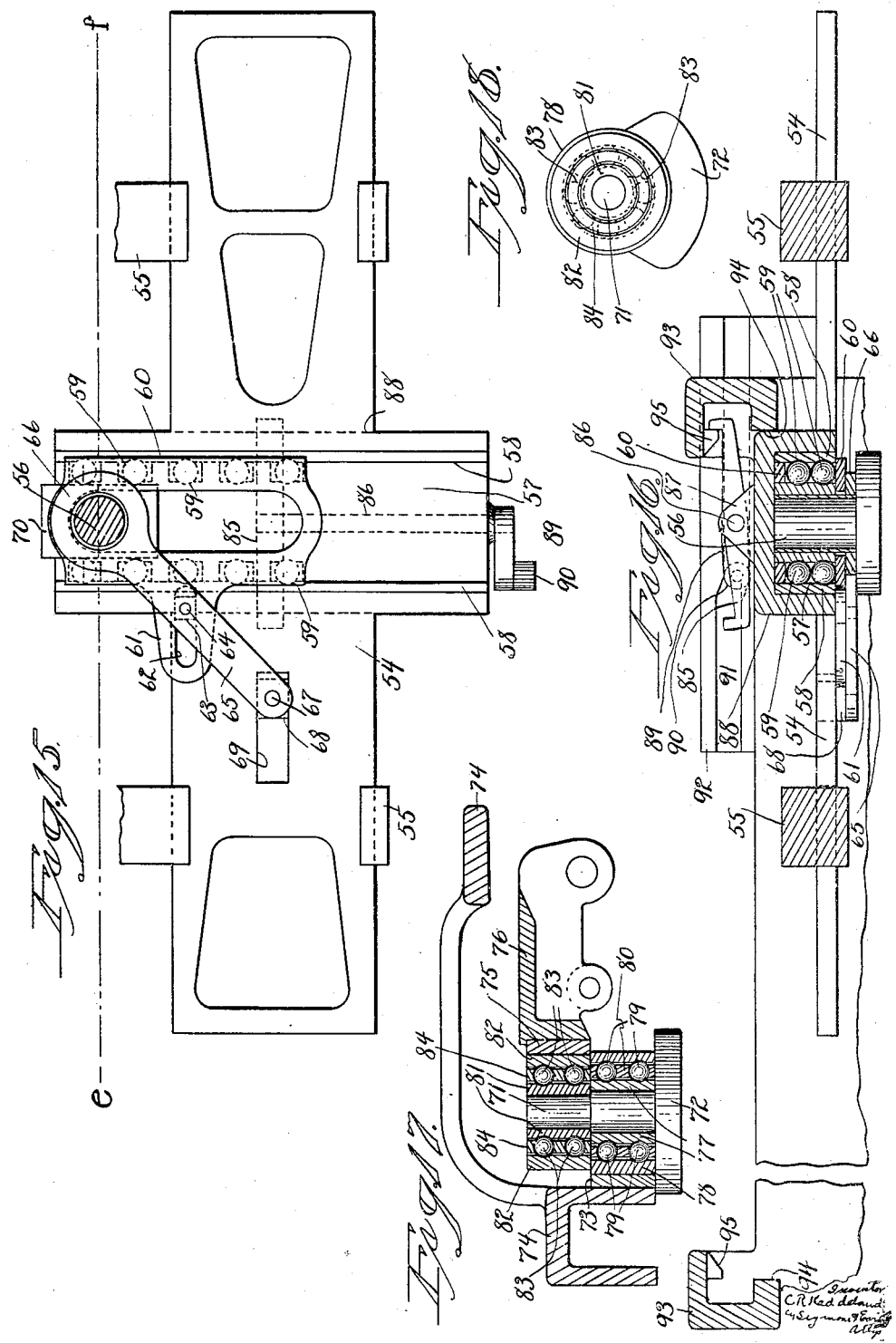

UNITED STATES PATENT OFFICE.

CHRISTEN R. KADDELAND, OF SHELTON, CONNECTICUT, ASSIGNOR TO THE WHITLOCK PRINTING PRESS MFG. CO., OF DERBY, CONNECTICUT, A CORPORATION.

MECHANICAL MOVEMENT.

1,198,727.

Specification of Letters Patent.

Patented Sept. 19, 1916.

Application filed January 17, 1916. Serial No. 72,572.

*To all whom it may concern:*

Be it known that I, CHRISTEN R. KADDELAND, a citizen of the United States, residing at Shelton, in the county of Fairfield and State of Connecticut, have invented a new and useful Improvement in Mechanical Movements; and I do hereby declare the following, when taken in connection with the accompanying drawings and the characters of reference marked thereon, to be a full, clear, and exact description of the same, and which said drawings constitute part of this application, and represent, in—

Figure 2:
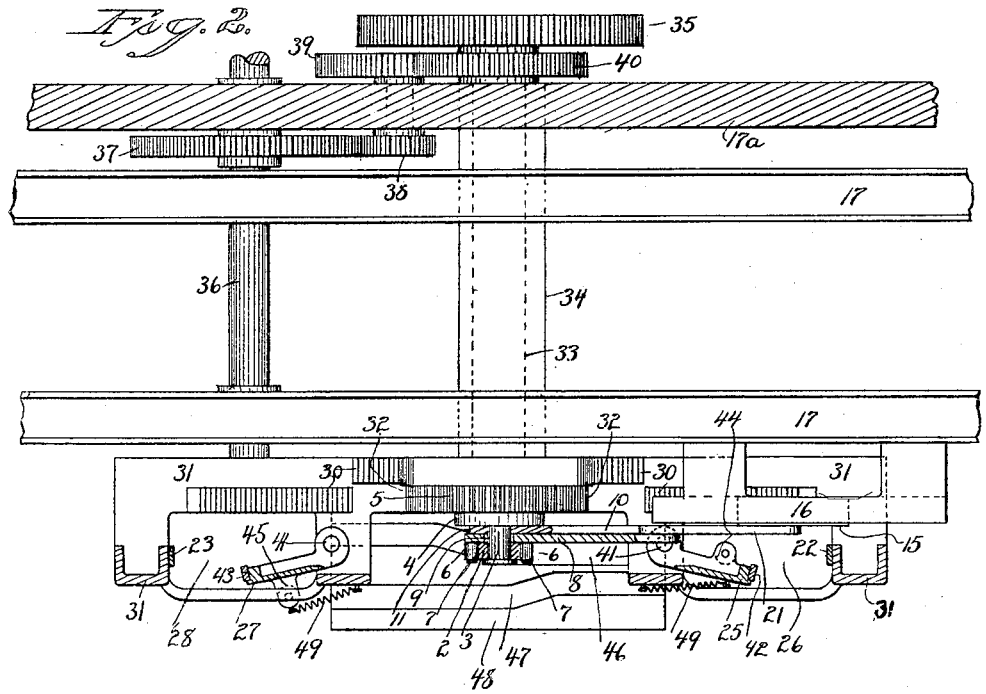
Figure 1:
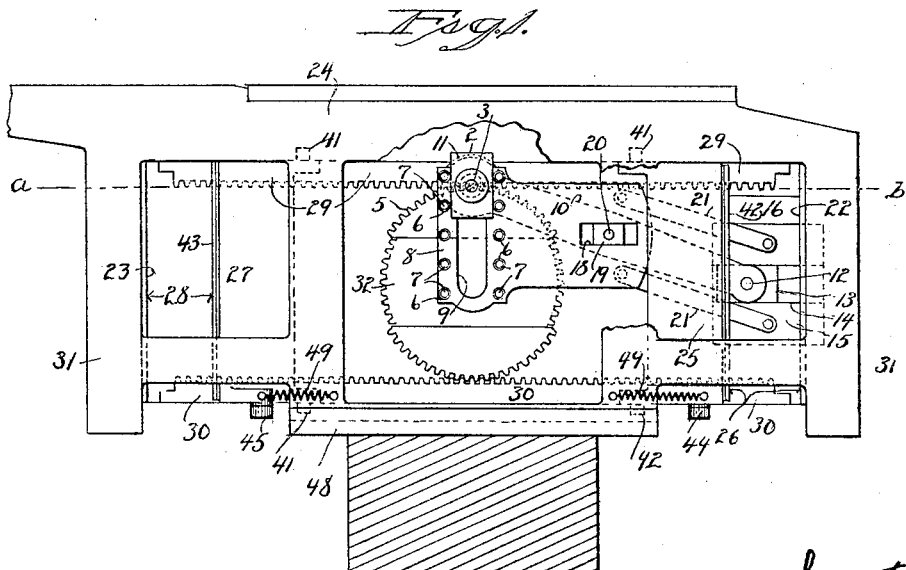

Figure 1 a broken view in side elevation of one form of my improved mechanical movement applied to the bed-motion of a flat-bed printing-press. Fig. 2 a view thereof in horizontal section on the line $a$—$b$ of Fig. 1, with the reversing mechanism shown in its intermediate position between the two guide-ways of the type-bed which is the part to be reciprocated. Fig. 3 a corresponding view with the reversing mechanism in the right hand guide-way. Fig. 4 a detached detail view in longitudinal section of the anti-friction member carrier. Fig. 5 a diagrammatic view showing the driving and reversing mechanisms of my improved mechanical movement in the positions due to them when they are intermediate in position between the two guide-ways. Fig. 6 a similar view showing the mechanisms in the positions due to them after the crank-pin or prime-mover has made a half revolution whereby the reversing block and anti-friction device have been entered into the lower end of the right hand guide-way as also shown in Fig. 3. Fig. 7 a similar view showing the mechanisms in the positions due to them after the crank-pin has made an additional quarter revolution, whereby the part to be reciprocated or type-bed has been retarded and brought to rest. Fig. 8 a similar view showing the positions due to the parts when the crank-pin has made an additional quarter turn, whereby the type-bed has been started up and accelerated in the opposite direction and brought to the point of normal speed, the anti-friction device being about to leave the guide-way. Fig. 9 a similar view showing the positions due to the parts after the crank-pin has made an additional half revolution, whereby the type-bed has been returned to the position in which it was shown in Fig. 5, although now traveling in the opposite direction. Fig. 10 a similar view showing the parts at the expiration of the additional half revolution of the crank-pin showing the anti-friction device entered into the upper end of the left hand guide-way. Fig. 11 a similar view showing the parts in the positions due to them after the crank-pin has moved through an additional quarter revolution, whereby the type-bed has been retarded and brought to rest at the opposite end of the stroke. Fig. 12 a similar view showing the parts in the positions due to them after an additional quarter revolution of the crank-pin, whereby the type-bed has been started up and accelerated to its normal speed, the anti-friction device being about to leave the left hand guide-way. Fig. 13 a broken detail view in side elevation, showing one of the modified forms which the anti-friction device may assume. Fig. 14 a view partly in vertical section and partly in end elevation on the line $c$—$d$ of Fig. 13. Fig. 15 a broken view showing another modified form of my improved mechanical movement. Fig. 16 a broken view thereof partly in plan and partly in horizontal section on the line $e$—$f$ of Fig. 15. Fig. 17 a broken detail sectional view of still another modified form of my invention. Fig. 18 a view in front elevation of the crank-pin and the anti-friction device of the preceding figure.

My invention relates to an improvement in mechanical movements for converting rotary into rectilinear motion and designed with particular reference to being utilized in flat-bed printing-press bed-motions characterized by the retardation and acceleration of the type-bed at the ends of the strokes thereof, the object being to produce a simple and compact device of superior durability and smoothness of operation.

With these ends in view, my invention consists in a mechanical movement having certain details of construction as will be hereinafter described and pointed out in the claims.

Since my improved mechanical movement is particularly adapted for use in reversing the type-bed of flat-bed printingpresses, for convenience of illustration and description, I have shown it so applied. In the construction shown in Figs. 1 to 12 inclusive of the drawings, I employ a rectangular reversing-block 2 mounted upon a crank-pin 3 having at its base a concentric flange 4 by means of which it is attached to the outer face of the main driving gear 5, near the periphery thereof. The bearing faces of the block 2 have contact respectively with the anti-friction rollers 6 of two rectilinear series of such rollers turning upon studs 7 mounted in a plate-like anti-friction-member carrier 8, the said series of rollers being parallel with each other and respectively located on opposite sides of a clearance slot 9 formed in the said carrier 8 for the outward passage through it of the crank-pin or prime-mover 3. The said reversing-block 2 is moved in a circular path by the crank-pin 3, while the carrier 8 has an elliptical movement imparted to it as the resultant effect of two separate driving agencies acting concurrently, namely, the said block 2 and a controller-arm 10 formed at its inner end with an eye 11 for the reception of the crank-pin 3. The outer end of the said arm 10 receives a stud 12 carried by a block 13 reciprocating in a groove 14 formed in a block 15 which reciprocates in a bracket 16 fastened to the track 17 fastened to the press-frame 17ª. The said carrier 8 is formed with a horizontal slot 18 receiving a block 19 which has a slight horizontal movement in it and which is mounted upon a stud 20 carried by the arm 10 and located centrally between the center of the crank-pin 3 and the center of the stud 12. Under this construction and arrangement of parts, the pin 3 acting through the block 2 and the anti-friction rollers 6, tends to move the carrier 8 in a horizontal direction, while the controller-arm 10 acting through the stud 20 and block 19, tends at the same time to move the carrier 8 in a vertical direction, whereby the carrier 8 is moved, as above stated, in an elliptical path of which the major axis is exactly twice the length of its minor axis.

To prevent the carrier 8 from canting in describing its said elliptical path, I employ, as shown, two paralleling bars 21 pivotally connected at their inner ends to the carrier and pivotally connected at their outer ends to the reciprocating block 15 before mentioned, whereby the carrier 8, and hence the series of parallel antifriction rollers 6 are at all times maintained in vertical position. Since the major axis of the elliptical path described by the carrier 8 is just twice as long as its minor axis, the vertical movement imparted to the carrier, and hence to the anti-friction rollers 6, is exactly half as great and half as rapid as the vertical movement of the block 2. This carefully predetermined adjustment of the relative movements of the block 2 and rollers 6 is designed to give the maximum durability to the mechanism by eliminating any sliding of the anti-friction rollers 6 upon the bearing faces of the block 2 and upon the two reversing abutments 22 and 23 respectively located at the right and left hand ends of the reciprocating type-bed 24. The abutment 22 and the gate 25 together form the right hand guide-way 26, while the abutment 23 and the gate 27 together form the left hand guide-way 28. The abutments 22 and 23 are relied upon for driving the type-bed while the gates 25 and 27 which co-act with the said abutments to form the two guideways, 26 and 28, act as safety abutments, as it were, by taking any rebound in the action of the reversing mechanism and typebed.

By eliminating, as described, any sliding of the anti-friction rollers 6, I secure the maximum smoothness of operation, since I am thus enabled to design and construct the parts without allowing, as has heretofore been necessary, space for the use of lubricants which are imperative wherever there is sliding contact. By the employment of the paralleling bars 21, I prevent the carrier 8 from canting during the periods of its idle movement from the guide-way 26 to the guide-way 28 and vice versa, whereby the anti-friction rollers 6 are maintained in predetermined, though variable positions with respect to the block 2, during the transit of the block 2 and carrier 8 from one guide-way to the other.

The gear wheel 5 co-acts with an upper rack 29 and a lower rack 30, the former being bolted to the lower face of the type-bed 24 and the latter being fastened to a frame 31 depending therefrom. The said gear-wheel 5 is provided with a double-ended sector 32 which is radially moved as required to co-act with the said racks the teeth of which are arranged in three sections, all as fully shown and described in United States Patent No. 950,136 of February 22nd, 1910, to W. S. Huson. However, I do not limit myself to such a gear-wheel and such racks, but hold myself at liberty to employ any substitutes therefor. As shown the gear-wheel 5 is mounted on a driving-shaft 33 running in a sleeve 34 and itself driven by a gear 35. The double-ended sector 32 of the gear 5 is controlled in its movement by a cam-shaft 36 driven by a train of gears and pinions 37, 38, 39 and 40, as shown in Fig. 2, and connected with the sector 32 by means not herein shown, but fully illustrated in the said Patent No. 950,136.

The reversing-abutments 22 and 23, the gates 25 and 27, and guide-ways 26 and 28, before referred to, are of known construction and operation and need neither detailed illustration nor description. As shown, the abutments 22 and 23 are secured to the respective ends of the depending frame 31, while the gates 25 and 27 turn upon trunnions 41 respectively journaled in the under face of the type-bed 24 and in the upper face of the frame 31. As shown the respective gates 25 and 27 are provided with shoes or plates 42 and 43. The said gates 25 and 27 are alternately swung into their clearance and operative or guide-way-forming positions by means of cam-rollers 44 and 45 respectively co-acting with cam-paths 46 and 47 in a stationary cam 48, the said gates being held in their open positions by springs 49. I do not, however, limit myself to the use of gates for the purpose of forming guide-ways for the reversing mechanism since other means for the purpose may be substituted, the guide-way-forming parts, as well as the driving mechanism herein shown and described, being chosen merely for the convenience of showing one application of my invention.

Before proceeding to a description of the operation of my improvement as illustrated in Figs. 1 to 12 inclusive, it may be noted that mechanical movements of the general type to which my invention belongs, have been objectionable on account of the heavy wear imposed upon the reversing member due to the weight of the part to be reciprocated and its momentum.

In overcoming the objections stated, I interpose an anti-friction device between the prime-mover represented by the crank-pin 3 and the member to be reciprocated represented by the type-bed 24, and have provided for imparting to the rollers 6 of the anti-friction device the amount of motion required to insure their rolling movement with the elimination of sliding friction.

With reference now to Figs. 5 to 12 inclusive of the drawings, they diagrammatically represent the sequential positions of the parts, beginning with the movement of the type-bed from its central position from right to left.

Beginning with Fig. 5 in which the parts of the reversing mechanism are shown in the position in which they are also shown in Figs. 1 and 2, the block 2 and pin 3 are illustrated at the limit of their upward movement. It may here be mentioned that three complete revolutions of the gear wheel 5 take place during each complete excursion of the type-bed 24 back and forth, the gear wheel making a complete revolution in engagement with the upper rack, a complete revolution in engagement with the lower rack, and a half revolution disengaged from both racks at which time the crank-pin 3 is brought into play for the reversing operation.

In Fig. 5, the gear-wheel 5 is shown in mesh with the lower rack 30 for moving the type-bed from right to left, the block 2 and the carrier 8 are at the limits of their upward movement, the type-bed 24 is in its central position moving from right to left, and the carrier 8 is disengaged from both of the guide-ways 26 and 28 and is in a central position between the same. Fig. 6, in sequence with Fig. 5, shows the positions of the parts at the termination of the next succeeding half-rotation of the gear-wheel 5 and the entrance of the two rectilinear series of anti-friction rollers 6 in the carrier 8, into the guide-way 26 which has just been formed by the closing movement of the gate 25. At this time the gear-wheel 5 is terminating its engagement with the lower rack 30, there being a slight overlapping of control at this point between the gear 5 and rack 30 on the one hand, and the reversing mechanism and the guide-way 26 on the other hand, this overlapping of control being made possible by the fact that the crank-pin 3 is by virtue of its position at this particular time traveling at the same horizontal speed as the said rack.

It will be noted, by comparing Figs. 5 and 6, that although in Fig. 6 the pin 3 and block 2 and the carrier 8 are at the limit of their downward movements, the carrier 8 has moved only half the distance in the vertical plane that the block 2 has moved, due to the principle already stated of having the carrier 8 move concurrently with, but just half the distance of, the block 2, and at just half the speed thereof.

Fig. 7, in sequence with Fig. 6, shows the positions of the parts at the termination of the next succeeding quarter-rotation of the gear-wheel 5 which has now carried the type-bed 24 to the extreme limit of its left hand or inward excursion and gradually retarded it from its normal velocity and brought it to a dead stop. At this time, the pin 3 and the block 2 and the carrier 8 stand midway between the upper and lower ends of the guideway 26, the pin and block 2 having moved twice the distance of the carrier 8 so as to occupy a central position with respect thereto. The parts are shown in the same position in Fig. 3 as in Fig. 7.

Fig. 8, in sequence with Fig 7, shows the positions of the parts at the termination of the next succeeding quarter-rotation of the gear-wheel 5. The type-bed 24 has now been started at zero and accelerated, and moving from left to right, has reached its normal velocity of speed. Meanwhile, the gear-wheel 5 is just engaging with the teeth of the upper rack 29 preparatory to continuing the movement of the type-bed 24 from left to right at a uniform speed. The gate 25 is just beginning to open to release the reversing mechanism. At this time, also, there is the same slight overlapping of control between the gear-wheel 5 and rack 29 on the one hand, and the reversing mechanism and the guide-way 26 on the other hand, as has already been mentioned in connection with the description of Fig. 6.

Fig. 9, in sequence with Fig. 8, shows the positions of the parts at the termination of the next succeeding half-rotation of the gear-wheel 5 during which the type-bed 24 has been returned to its central position, corresponding to Fig. 5 but traveling in the opposite direction. The reversing mechanism is midway between the two guide-ways 26 and 28, the pin 3 and block 2 and the carrier 8 being at the limit of their lower positions.

Fig. 10, in sequence with Fig. 9, shows the positions of the parts at the termination of the next succeeding half-rotation of the gear-wheel 5 and the entrance of the two rectilinear series of anti-friction rollers 6 into the guide-way 28 which has just been formed by the closing movement of the pivotal gate 27. The gear-wheel 5 is terminating its engagement with the upper rack 29, there being a slight overlapping of control at this point between the gear 5 and rack 29 on the one hand, and the reversing mechanism and the guide-way 28, on the other. In this figure the pin 3 and the block 2 and carrier 8 are shown at the limit of their upward movement. Fig. 10, in sequence with Fig. 9, shows the parts in the positions due to them at the termination of the driving action of the gear 5 upon the type-bed 24, from left to right. At this time, the reversing mechanism begins its retarding function.

Fig. 11, in sequence with Fig. 10, shows the positions of the parts at the termination of the next succeeding quarter-rotation of the gear-wheel 5 and the termination of the retarding movement of the type-bed which has been brought to a stop.

Fig. 12, in sequence with Fig. 11 shows the positions of the parts at the termination of the next succeeding quarter-revolution of the gear-wheel 5 during which the type-bed 24 has been reversed and accelerated to its normal speed, transferred from the control of the reversing mechanism to the control of the gear-wheel 5 through the lower rack 30. It will be understood that as the gear-wheel 5 cuts into engagement with the lower rack 30, the gate 27 swings into its open position to release the reversing mechanism. The next half revolution of the gear-wheel 5 will restore the parts into the positions in which they are shown in Fig. 5.

It will be observed by following Figs. 5 to 12, inclusive, that the block 2, instead of having any direct contact with the abutments 22 and 23 and the shoes 42 and 43 of the gates 25 and 27, has rolling contacts with antifriction rollers 6 which are interposed between the bearing faces of the block 2 and the said abutments and shoes. In other words, the block rolls on the rollers 6 up and down through the guide-ways instead of sliding up and down upon the said abutments and shoes. Now as I have provided for causing the carrier 8 of the anti-friction rollers 6 to travel at exactly half the speed of the block 2, I have insured the rolling action of the rollers 6 by taking advantage of the well understood principle that to avoid sliding, the axes of the anti-friction members, whatever their form may be, must travel at half the velocity of the added velocities of the two surfaces with which they co-act. In the present case the block 2 has double the vertical movement of the axes of the rollers, the speed of the other co-acting surfaces in the vertical direction, being represented in the equation by 0. In this connection I may call attention to the fact, that in the construction illustrated, the thrust is entirely taken across the diameters of the rollers 6 without being transmitted through the studs 7 by which they are merely retained in place. The carrier 8 has no part in the reversing function but to keep the rollers 6 in place.

In the modified construction shown by Figs. 13 and 14 of the drawings, I employ solid anti-friction rollers 50, held in place by chambered retaining-plates 51 secured by bolts 52 and having slots 53 through which portions of the said solid rollers 50 project for co-action with the block 2 and the co-acting faces of the guide-ways. This modified construction acts on precisely the same principle as that already described.

In Figs. 15 and 16, I have shown my invention applied to a so-called Scotch-yoke 54 supported in bearings 55 and moved horizontally back and forth by the crank-pin or prime-mover 56 which is mounted in the periphery of a gear-wheel, not shown, but corresponding to the gear-wheel 5 elsewhere described. The said yoke 54 is formed with a vertical guide-way 57 the side walls of which are furnished with hard steel bearing-plates 58 corresponding to the faces of the guide-ways 26 and 28 and co-acting with anti-friction balls 59 located in suitable pockets in a vertically movable carrier 60 having a lateral arm 61 formed with a slot 62 receiving a block 63 entered by a stud 64 mounted in a controller-arm 65 one end of which is enlarged to form an eye 66 encircling the pin 56 and the other end of which is provided with a stud 67 entering a block 68 in a slot 69 in the yoke 54, whereby the crank-pin 56 is caused to move the carrier 60 up and down in the guide-way 57 at half the speed of a reversing block 70 also mounted upon the crank-pin 56 and interposed between the two vertical series of balls 59 in the carrier 60 so that its side faces are in constant contact therewith. By locating the pin 64 exactly midway between the centers of the crank-pin 56 and the stud 67, the carrier 60 is caused to move in the vertical direction at just half the speed of the reversing block 70, in accordance with the rule already stated that to avoid sliding the axes of the antifriction members must travel at half the velocity of the added velocities of the two surfaces with which they co-act. For instances of the use of Scotch-yokes in flatbed printing-press bed-motions, reference may be made to United States Patents No. 475,772 dated May 31, 1892, and No. 570,597 dated November 3, 1896, both granted to Winfield S. Huson for mechanical movements.

In the application of my invention shown by Figs. 17 and 18, the crank-pin or prime-mover 71 is furnished with a flange 72 for being mounted upon a gear-wheel, not shown, but generally corresponding to the gear-wheel 5. The said pin 71 mounts two independently organized, but co-acting anti-friction devices each of which is constructed and arranged to operate in accordance with the principle already set forth. The inner device has a circular inner raceway 77 encircling the inner portion of the crank-pin or prime-mover 71 and a concentric outer raceway 78 sufficiently larger than the inner raceway 77 to form between them a concentric space for the reception of two circular series of anti-friction balls 79 spaced or positioned by a concentric perforated cage 80 of any approved construction. The periphery of the outer raceway 78 rolls upon the abutment face 73 fixed upon the depending frame 74. The outer anti-friction device is mounted upon the reduced outer portion of the crank-pin 71 and comprises an inner circular raceway 81 and a concentric outer raceway 82, the space between which is enough larger in diameter than the diameter of the raceway 81, to provide for the reception of two circular series of antifriction balls 83 spaced apart or positioned by a suitable cage 84. The periphery of the outer raceway 82 co-acts with the bearing face 75 secured to the swinging gate 76. In both of these devices, the axes of the balls will travel at half the velocity of the added velocities of the surfaces with which they co-act. In this construction it is unnecessary to provide for moving the cages 80 and 84 at a predetermined speed for the reason that the antifriction balls themselves are arranged concentric with the crank-pin 71 and travel in a circular path, whereas the antifriction members of the other embodiments of my invention are arranged in rectilinear series.

With regard to the modification shown by Figs. 17 and 18, it will be observed that the two independently organized ball-bearing devices above described, as I employ them, operate in a novel manner, inasmuch as it is the outer raceways that are rolled by the contact of their outer peripheries upon the guideway faces.

Another feature of my invention is shown in Figs. 15 and 16 of the drawings in which the Scotch-yoke 54 is furnished with a centrally located double-ended latch 85 secured to the upper end of a shaft 86 journaled in lugs 87 upon the rearwardly offsetting portion 88 of the said yoke. At its lower end the shaft 86 is furnished with an arm 89 carrying a cam-roller 90 traveling in a cam-path 91 in a stationary cam 92. In this case the type bed, which is not shown, but which will correspond to the type-bed 24, is furnished with a depending frame 93 corresponding to the frame 31 of the other figures, the said frame 93 being furnished at its ends with abutments 94 respectively co-acting with the sides of the offsetting portion 88 of the yoke. The said frame 93 is also furnished at its ends with coupling-lugs 95 with which the respective ends of the double-ended latch 85 co-act for periodically coupling the yoke 54 with the frame 93 and hence with the type-bed. Under this construction, the driving thrust of the Scotch-yoke 93 is between the side faces of the offset 88 and the abutments 94, while the yoke and frame are prevented from separating by the action of the ends of the latch 85 and the lugs 95. In any embodiment of my invention, the antifriction members are in fact pressure-members, since the thrust is transmitted diametrically through them.

I claim:—

1. In a mechanical movement for converting rotary into reciprocatory motion, the combination with a prime-mover, of a part to be reciprocated, a reversing mechanism interposed between the said prime-mover and part, including a series of rolling-members having simultaneous engagement with the driving-and-driven faces with which they co-act, a carrier in which the said series of rolling-members are maintained in position with respect to each other, and means for imparting motion to the carrier.

2. In a mechanical movement for converting rotary into reciprocatory motion, the combination with a crank-pin, of a part to be reciprocated, and a reversing mechanism interposed between the said crank-pin and part and including a block mounted upon the said crank-pin, two rectilinear series of antifriction members, a carrier in which the said members are spaced relative to each other, and means for imparting motion to said carrier.

3. In a mechanical movement for converting rotary into reciprocatory motion, the combination with a reversing-block traveling in a circular path, of a part to be reciprocated, a reversing mechanism interposed between said block and part, including antifriction pressure members, a carrier for said antifriction members, and means coacting with said reversing-block to impart motion to said carrier.

4. In a mechanical movement for converting rotary into a reciprocatory motion, the combination with a crank-pin, of a part to be reciprocated having two guideways, and a reversing mechanism including a reversing-block carried by the said crank-pin, two rectilinear series of rolling antifriction pressure-members respectively engaging with the opposite faces of the said block and with the faces of the said guideways, a carrier in which the said members are spaced apart with respect to each other, and controlling means for the said carrier.

5. In a mechanical movement for converting rotary into reciprocatory motion, the combination with a crank-pin, of a part to be reciprocated, and a reversing mechanism comprising a reversing block mounted upon the said crank-pin, two series of rolling antifriction pressure members respectively engaging with the bearing faces of the said block and adapted to be periodically connected to the said part, a carrier in which the said rolling members are spaced with respect to each other, means coöperating with the crank-pin for imparting motion to the said carrier, and means for maintaining the block and carrier in parallelism.

6. In a mechanical movement for converting rotary into reciprocatory motion, the combination with a prime-mover, of a part to be reciprocated, abutments carried by same, a reversing-block carried by said prime-mover, two series of rolling antifriction pressure-members engaging the bearing faces of said block and adapted to periodically coöperate with the said abutments, a carrier for said pressure-members, means coöperating with the reversing-block to move said carrier, and hence the said pressure-members, and means for maintaining the carrier in parallelism with the abutments.

7. In a mechanical movement for converting rotary into reciprocatory motion, the combination with a prime-mover, of a part to be reciprocated, guideways carried by same, a reversing-block carried by said prime-mover, rolling antifriction pressure members, a carrier for same, means coöperating with the reversing-block for imparting motion to same, and means for maintaining the carrier in parallelism with the guideways.

8. In a mechanical movement for converting rotary into reciprocatory motion, the combination with a prime-mover, of a part to be reciprocated having abutments, and a reversing mechanism interposed between the said prime-mover and the said abutments, including a Scotch-yoke actuated in being reciprocated by the said prime-mover, a series of rolling-members interposed between the said prime-mover and the Scotch-yoke, and coupling-means carried by the said yoke and adapted to be intermittently coupled with the part to be reciprocated.

9. In a mechanical movement for converting rotary into reciprocatory motion, the combination with a prime-mover, of a part to be reciprocated, and a reversing mechanism interposed between the said prime-mover and part to be reciprocated, including a Scotch-yoke reciprocated by the said prime-mover, and a double-ended latch carried by the said yoke and having its ends alternately coupled with the part to be reciprocated.

10. In a mechanical movement for converting rotary into reciprocatory motion, the combination with a prime-mover, of a part to be reciprocated, and a reversing mechanism interposed between the said prime-mover and part to be reciprocated, the said mechanism including a Scotch-yoke reciprocated by the said prime-mover, coupling means carried by the said yoke, and a cam constantly controlling the function of the said coupling means.

CHRISTEN R. KADDELAND.

Copies of this patent may be obtained for five cents each, by addressing the "Commissioner of Patents, Washington, D. C."